W. C. DEMENT.
HAY GATHERING AND BALING MACHINE.
APPLICATION FILED FEB. 12, 1917.

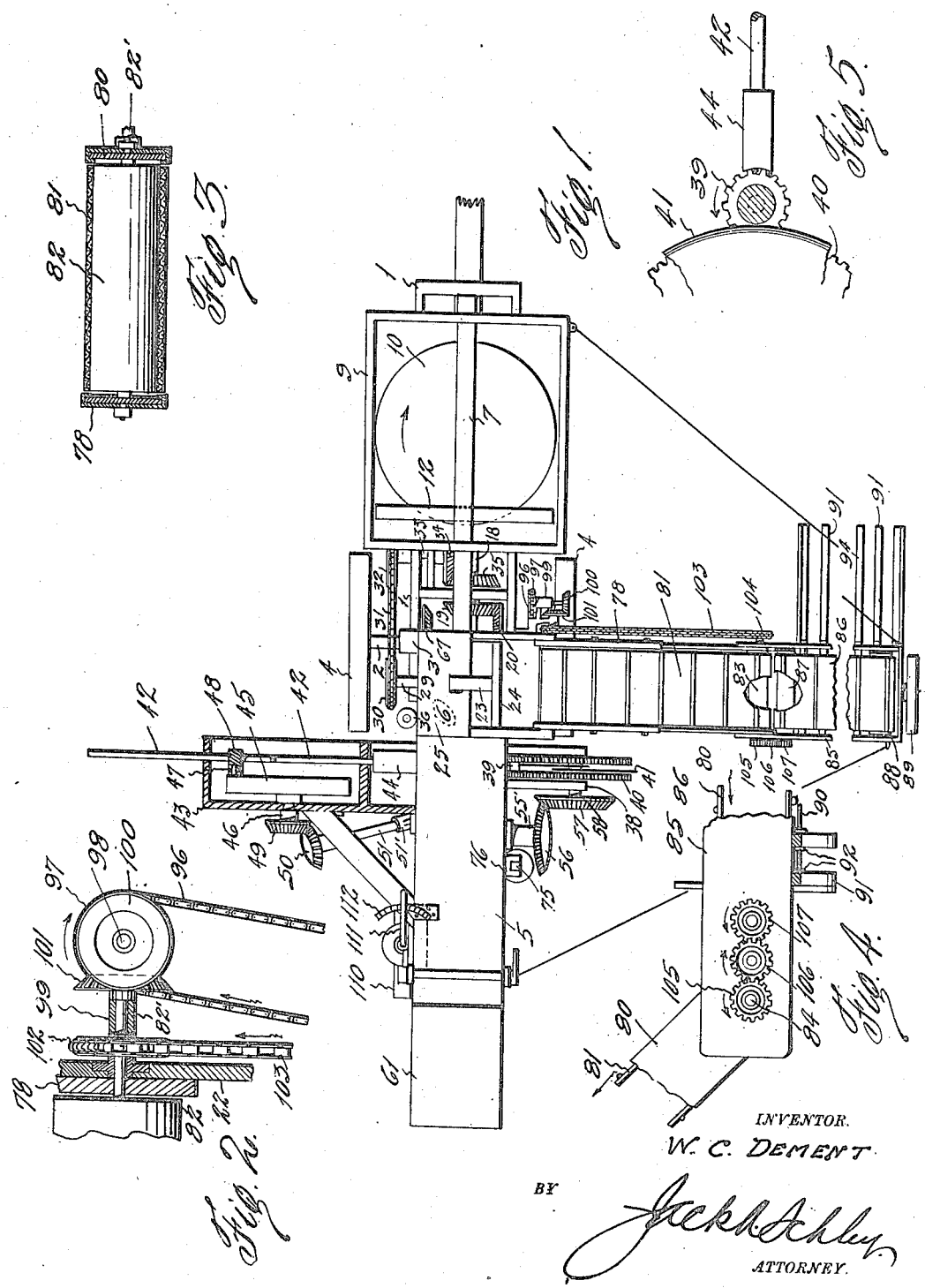

1,247,233.

Patented Nov. 20, 1917.
3 SHEETS—SHEET 2.

INVENTOR.
W. C. DEMENT,
BY
*Jack A. Schley,*
ATTORNEY.

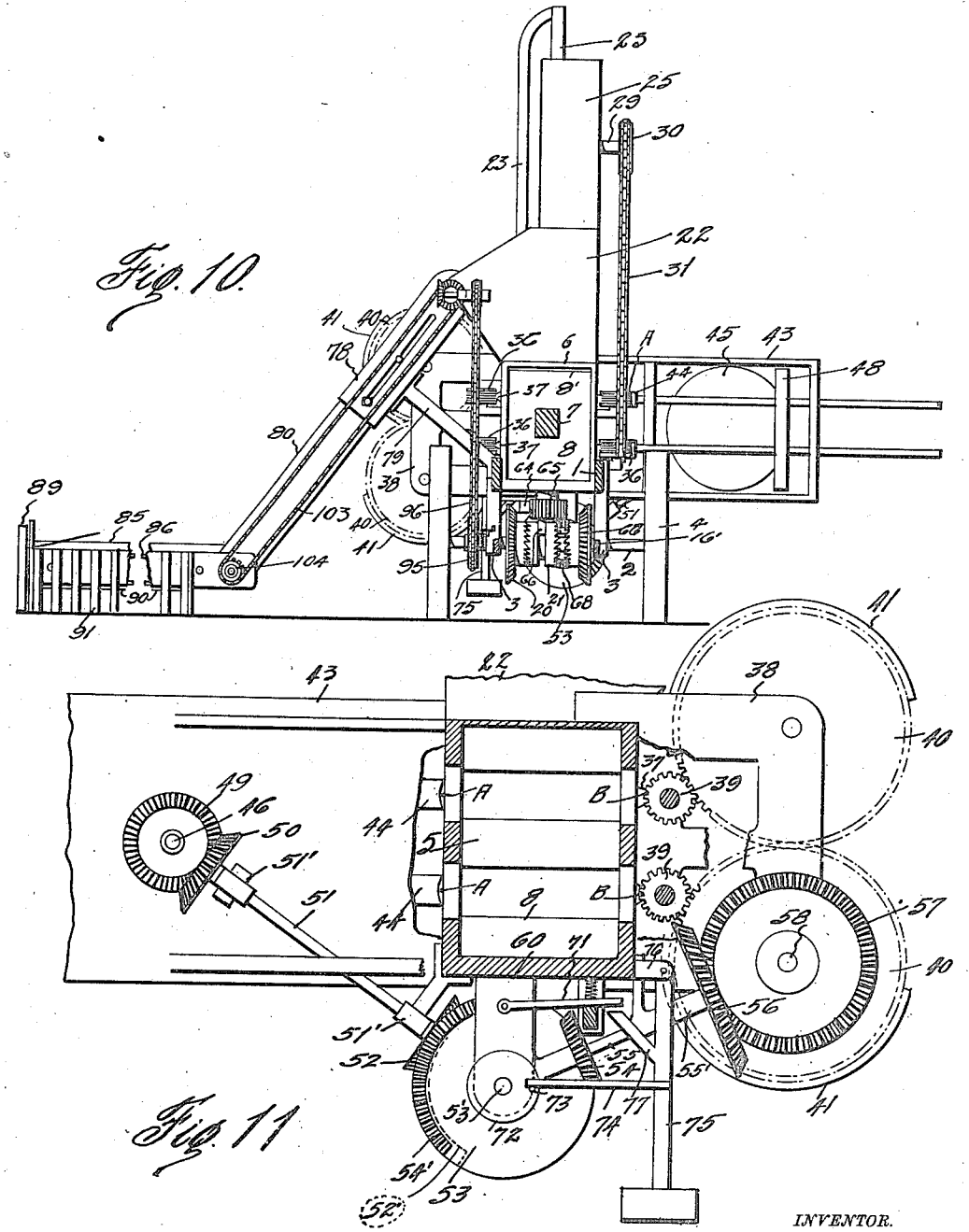

UNITED STATES PATENT OFFICE.

WILLIAM C. DEMENT, OF EMORY, TEXAS.

HAY GATHERING AND BALING MACHINE.

1,247,233.  Specification of Letters Patent.  Patented Nov. 20, 1917.

Application filed February 12, 1917. Serial No. 148,002.

*To all whom it may concern:*

Be it known that I, WILLIAM C. DEMENT, a citizen of the United States, residing at Emory, in the county of Rains and State of Texas, have invented certain new and useful Improvements in Hay Gathering and Baling Machines, of which the following is a specification.

This invention relates to the baling of hay and the like.

In carrying out the invention it is proposed to build a portable structure combining a baling press, a rake for gathering the hay, a conveyer for conveying the hay from the rake to the press, and a tying mechanism for tying the wire about the bales.

The machine may be built with a longitudinal frame mounted on ground wheels which revolve an axle acting as a main driving member. A baling box and a baling chamber are mounted on the frame together with a plunger operating through said box and chamber. A rake or gathering member is projected laterally from the frame and includes a conveyer moving toward the frame and coöperating with an upwardly inclined conveyer delivering to the press box.

A tying device is mounted on the frame. An operating device normally operating the plunger and all other parts except the tying device is automatically shifted when a bale is discharged from the machine, thus engaging means for operating the tying mechanism.

The invention will be more readily understood from a perusal of the following specification and by reference to the accompanying drawings, wherein:

Figure 1 is a plan view of the machine,

Fig. 2 is a detail of the elevator and conveyer drive,

Fig. 3 is a cross-sectional detail of the telescoping elevator frame,

Fig. 4 is a detail in elevation of the driving connection between the elevator and the conveyer, Fig. 5 is a sectional detail of the wire twisting and cutting means, Fig. 6 is a longitudinal sectional view of the machine, Fig. 7 is a diagrammatical view indicating the wire tying operation, Fig. 8 is a transverse sectional detail of the swinging connection between the elevator and the conveyer, Fig. 9 is an end elevation of the rake member and conveyer, Fig. 10 is a transverse vertical sectional view, Fig. 11 is an enlarged detail of the tying and cutting operating means, other parts being omitted.

In the drawings the numeral 1 designates a longitudinal frame mounted on an axle 2 by standards 3 (Fig. 10). The axle is free to revolve and is secured to ground wheels 4. On the rear end of the frame a baling chamber 5 of conventional construction is provided and communicates with a baling box 6 at the central portion of the frame. A plunger 7 is formed with a head 8 which operates through the box and into the chamber. The plunger slides through a support 9 mounted on the frame and within which a horizontal disk 10 is mounted. This disk has an upstanding pin 11 eccentrically mounted and engaging in an elongated transverse housing 12 fixed on the plunger. It is obvious that when the disk is revolved the plunger will be reciprocated, this movement being a well known one.

The disk has a vertical shaft 13 depending and carrying a bevel gear 14 driven by another bevel gear 15 mounted on a transverse shaft 16 supported in an under frame 16′ suspended from the forward end of the frame 1. A shaft 18 is mounted longitudinally of the under frame and carries a bevel pinion 17 at its forward end which meshes with the gear 15; while at the rear end of the shaft a bevel pinion 19 is secured. The pinion 19 is driven by a main driving gear 20 loosely mounted on the axle and having a clutch hub normally engaged by a sliding clutch sleeve 21 keyed on the axle.

On the baling box 6 a hopper 22 is mounted. A feeding plunger 23 travels vertically through the hopper and has a head and guard 24 which forces the hay down into the box. The drive for the plunger 23 is like that for the main plunger and comprises a supporting frame 25, a disk 26, eccentric pin 27 and transverse housing 28. The disk is mounted on a horizontal shaft 29 having a sprocket wheel 30 secured on its outer end. This wheel is driven by a chain 31 which is driven by a sprocket wheel 32 secured on a shaft 33 mounted in the under frame and having a bevel gear 34 on its inner end meshing with a bevel gear 35 fixed on the shaft 18. The parts are timed so that the feeding plunger 23 will reach the upper end of its stroke as the baling plunger head 8 passes through the box.

The hay being delivered to the hopper 22, by means hereinafter described, is forced down into the baling box 6 by the plunger head 24 and in the path of the reciprocating baling plunger-head 8. The hay is forced into the baling chamber 5 and the bale formed in the usual manner. On each side of the machine, as shown in Fig. 10, a pair of wire spools 36 are mounted in superposed order. Wires A are led from the spools on one side and wires B come from the spools on the other side. When the machine is first used the wires A are carried across the chamber and twisted with the wires B, whereby upper and lower loops are formed in the path of the hay forced into the chamber. As the bale is formed and moved rearward in the chamber the loops of wire are carried rearward so that they embrace said bale on three sides. To complete the "wiring" of the bale it is merely necessary to carry the wires A over to the wires B as indicated in dotted lines in Fig. 7. By twisting the wires A and B together, the bale is tied and by cutting the twists in the center, loops are left for the succeeding bale.

The wires B are fed through guides 37 in laterally projecting brackets 38 mounted on the side of the baling chamber 5 in juxtaposition to the baling box 6. Small twisting pinions 39 are journaled in the brackets and are associated with the guides so that the wires B will be received in the teeth of the pinions. These pinions mesh with gears 40 also mounted in the brackets. The gears are considerably larger in diameter than the pinions. The pinions and gears are arranged in pairs, the pinion or gear of each pair being spaced from its mate to provide a space therebetween. Semicircular knives 41 are carried by the gears in offset relation to each other. Each knife projects from the peripheries of its respective gears and is mounted therebetween, said knife occupying about one-half the circumference of its gears. The knives are received in the spaces between the mates of each pair of pinions and thus cut the twisted wires spanning such spaces. The gears will revolve the pinions several times during each revolution of said gears.

Directly opposite the pinions a pair of superposed wire carriers 42 are mounted in a housing 43 carried on the side of the machine. Each carrier has a head 44 provided with curved face conforming to the contour of the pinions. The wires A lie against these faces and when the carriers are moved transversely through the chamber 5 the said wires are looped over to the pinions 39 and the wires A as indicated in dotted lines in Fig. 7. After the wires A and B have been brought together the pinions and gears are revolved. During the first half of the revolution of the gears the wires are twisted together, but during the last half of the revolution the twists are severed by the knives 41; however the pinions continue to twist the severed ends so that each pair of pinions completes two separate twists, one of the wires surrounding the bale and the other of the wires remaining for the next bale.

For reciprocating the carriers 42 the same disk and pin movement is used as is employed for the plungers 7 and 23. A disk 45 is mounted on a shaft 46 in the housing 43 and carries an eccentric pin 47 engaging in a transverse housing 48 which latter is fastened on the carriers. The shaft 46 projects through the housing 43 and has fastened on its end a bevel pinion 49 meshing with a bevel pinion 50. The pinion 50 is fixed on the upper end of a shaft 51 supported in brackets 51' fastened to the housing 43 and the frame of the machine. A bevel pinion 52 is fastened on the lower end of the shaft 51 and is positioned to mesh with a segment of teeth 52' on one side of a mutilated gear 53 fixed on a longitudinal shaft 53' suspended in brackets 60 and 60' under the press. On its opposite side the mutilated gear has another segment of teeth 54' adapted to engage a bevel pinion 54 mounted fast on the lower end of a shaft 55 supported in a bracket 55' mounted on baling chamber. A bevel gear 56 is fastened on the upper end of the shaft and drives a bevel gear 57 fastened on the shaft 58 of one of the tying gears 40.

The segments of teeth 52' and 54' are relatively positioned so that the teeth 52' will engage the pinion 52 and transmit motion to the disk 45 in advance of the engagement of the teeth 54' with the pinion 54; whereby the carrier heads 44 will arrive at the twisting gears 39 at about the same time as motion is imparted to the latter by the engagement of teeth 54' with the pinion 54. During a single revolution of the mutilated gear the carriers 42 are moved through the baling chamber and returned and the gears 40 completely revolved.

During the baling operation the mutilated gear 53 is dormant and is not called upon to operate until the bale is pressed and ready to be wired and tied. As before stated when the machine is first operated the ends of the wires A and B are manually tied together to form the loops for the first bale, but after the first bale is tied, the machine will perform the tying operation. At the rear end of the baling chamber a tripping plate 61 is hinged and when a bale is forced onto this plate, the latter is swung down by the bale as the latter is discharged. As a bale is completed and reaches the tying stage, the previously completed and tied bale is discharged from the chamber 5 and trips the plate 61. The plate has a lug 62 bearing against a spring pressed plunger 63 carrying a gear rack 64 on its forward end and mounted under the press. The rack is in engagement with a pinion 65 mounted horizontally over the clutch sleeve 21 and said pinion is provided with a depending eccentrically mounted pin 66 bearing in the groove of the clutch sleeve. The sleeve is normally in engagement with the gear 20 which drives the baling plunger and feeding mechanism.

When the plate 61 is swung downward and the plunger 63 thus driven forward, the rack 64 will rotate the pinion 65 whereby the eccentric pin 66 will swing in an arc and shift the sleeve 21 on the axle 2, out of engagement with the gear 20 and into engagement with the clutch hub of a bevel gear 67 loosely mounted on the axle and meshing with a bevel pinion 68 on the forward end of the shaft 53′ which carries the mutilated gear. This action will take place when the parts are in the positions shown in Fig. 6, because the plunger head 8 would be at the rear extremity of its stroke when pushing the completed bale from the chamber 5. The head 8 carries a tail plate 8′ closing the bottom of the hopper when the head is in this position. The head and feeding mechanism described will remain in this position until motion is again imparted thereto.

It is obvious that the tripping plunger 63 being spring pressed, must be locked in its forward position, otherwise the spring would return the plunger to its normal position. The plunger 63 is provided with a notch 70 in the path of a latch 71 pivoted on the bracket 60 and projecting laterally therefrom. This latch drops into the notch when the plunger is moved forward and holds the same. After the mutilated gear has completed a revolution its duty has been performed and the clutch sleeve 21 must be shifted back to the gear 20 and this is readily accomplished by releasing the plunger 63, whereby the pinion 65 is rotated in a reverse direction through the agency of the rack 64. The releasing operation is carried out by means of a disk 72 mounted on the rear end of the shaft 53′ and provided with an eccentric pin 73. A tripping lever 75 depends from a bracket 76 on the side of the baling chamber as is best shown in Fig. 11. This lever has a rigid laterally extending arm 74 projecting into the path of the pin 73 and is also weighted so as to swing readily when displaced. A second rigid arm 77 projects from the lever. When the disk 72 is about to complete its revolution the pin 73 trips past the end of the rigid arm 74 whereby the weighted lever is displaced laterally and caused to swing. When the lever swings inward the arm 77 will impinge the latch and displace it upward and out of the notch, whereby the plunger will be released. When the machine is used for the first time it will be necessary to depress the plate 61 manually to tie the first bale.

As this machine is moved over the field after the hay has been cut, means for gathering and elevating the cut hay to the hopper 22 is provided, thus eliminating the usual separate operation of raking. An elevator main frame 78 has its upper end mounted on the edge of the hopper and inclines downward, having its lower portion supported on a brace 79 extending outward from the frame of the machine as is best shown in Fig. 10. The frame 78 has an extension frame 80 telescoping thereinto and suitably fastened either in its extended or withdrawn positions. The frame 80 projects downward and terminates in juxtaposition to the ground when extended. When the machine is being transported the extension frame is moved upward or withdrawn so that its lower end is elevated some distance above the ground.

An elevator belt 81 passes over a roller 82 journaled in the upper end of the main frame 78 and a roller 83 journaled in the lower end of the extension frame. As shown in Fig. 8 the roller 83 is fast upon a transverse shaft 84. This shaft also forms a hinge for the inner end of an outwardly extending conveyer and gathering frame 85 projecting laterally from the machine. When not in use the frame 85 may be swung upward and against the elevator frames. A conveyer belt 86 travels over a roller 87 in juxtaposition to the roller 83 and a roller 88 at the outer end of the frame 85. The outer end of the frame 85 is supported by a small ground wheel 89 mounted thereon. Under the front edge of the conveyer frame a hinge rod 90 is mounted as indicated in Figs. 4, 9 and 10. Tines 91 are hinged by means of clips 92 on the rod and properly spaced apart. Each tine has a tail 93 extending under the frame 85, the rear end of the tail impinging the frame and limiting the downward swing of the tine. By this pivotal mounting the tines will tilt upward and ride over obstructions. The tines have inclined ridges 94 leading up to the front edge of the frame 85 and as the machine traverses the field the tines ride under the hay and the latter is received on the conveyer belt 86.

For driving the belts 81 and 86 a sprocket wheel 95 is clutched on the axle 2 and drives an upwardly extending sprocket chain 96 which drives a sprocket wheel 97 mounted on shaft 98 supported in a bracket 99 secured to the side of the hopper (see Figs. 1, 2, and 10). A bevel gear 100 is secured on the shaft 98 and drives another bevel gear 101 fastened on the projecting end of the shaft 82' of the belt roller 82. A sprocket wheel 102 is fastened on the shaft 82' and drives a chain 103 extending down and driving a sprocket 104 secured on the shaft 84 (Fig. 8). On the opposite end of the shaft 84 a spur pinion 105 is fastened. The pinion meshes with an intermediate pinion 106 which in turn meshes with a pinion 107 fastened on the shaft of the roller 87. These gears are employed so that the two belts will travel in the same direction.

The direction of rotation and revolution of various parts has been indicated by arrows on the drawings. The operation of the machine it is believed, will be clear from the foregoing description and a repetition is considered unnecessary. The machine may be drawn by draft animals or otherwise propelled. For steering and supporting the machine a trailer wheel 110 is mounted on one side of the baling chamber and provided with a steering lever 111 adapted to swing over said chamber and engaging a toothed locking segment 112 fastened on the top of the chamber.

The foregoing description and illustration clearly express the invention, but it is to be understood that said illustration is merely an exemplification and the invention may be carried out in various other ways.

What I claim, is:

1. In a machine of the character described, the combination with a wheel supported main frame having baling means, of a gathering and feeding mechanism including a feed hopper mounted on the frame, a reciprocating plunger mounted on the hopper, an elevator depending laterally from the hopper, an outwardly extending horizontal conveyer hinged to the lower end of the elevator, a supporting wheel carrying the outer end of the conveyer, and a gathering member attached to and projecting forward from one side of the conveyer.

2. In a machine of the character described, the combination with a wheel supported main frame having baling means, of a gathering and feeding mechanism including a feed hopper mounted on the frame, a reciprocating plunger mounted on the hopper, an elevator depending laterally from the hopper, an outwardly extending horizontal conveyer hinged to the lower end of the elevator, a supporting wheel carrying the outer end of the conveyer, and a gathering member including a plurality of forwardly projecting tines pivotally mounted on the conveyer, whereby their forward ends may yield upwardly.

3. In a hay gathering and baling machine, a main frame, an axle supporting said frame, ground wheels mounted on the axle, a clutch member mounted on the axle, a baling structure mounted on the frame, a feeding device mounted above the baling structure, driving elements connected with the baling and feeding structures for operating the same, a common operating member normally engaged with the clutch member, a wire tying device correlated with the baling structure and normally idle, driving means for operating the tying device, and means for moving the clutch member out of engagement with the common operating member and into engagement with the driving means of the tying device, in combination with a hay gathering and elevating structure extending laterally from the frame at the feeding device.

4. In a machine of the character described, the combination with a feeding and gathering structure, a baling structure, a wheel supported frame carrying both of said structures, and a tying device mounted on the frame, of means for imparting motion carried by the frame, a clutch member operated by said means, a common operating member normally engaged by the clutch member, driving elements for the feeding and baling structures having operative connection with the common operating member, an operating member for the tying device within the path of the clutch member and normally idle, driving connections between the tying device and its operating member, and means for moving the clutch member out of engagement with the common operating member and into engagement with the tying device operating member, whereby the feeding and baling structures cease to operate and the tying device is operated.

5. In a hay gathering and baling machine, a wheel supported frame, a baling structure mounted on the frame, and a feeding structure mounted adjacent the baling structure, in combination with a telescoping elevator mounted on the side of the frame and discharging into the feeding structure, and a gathering and conveying device hinged to the lower end of the elevator.

6. In a machine of the character described, the combination with a feeding structure, a baling structure, and a wheel supported frame carrying both structures, of a tying device, means for operating the tying device normally idle, a tripping device for setting the said operating means in motion, and a depressible member mounted on the baling structure and arranged to be operated by discharged bales of hay and to engage and operate the tripping device.

7. In a machine of the character described, the combination with a feeding and gathering structure, a baling structure, a wheel supported frame carrying both of said structures, and a tying device mounted on the frame, of means for imparting motion carried by the frame, a clutch member operated by said means, a common operating member normally engaged by the clutch member, driving elements for the feeding and baling structures having operative connection with the common operating member, an operating member for the tying device within the path of the clutch member and normally idle, driving connections between the tying device and its operating member, and a bale operated tripping device including a member mounted on the frame so as to be disposed by a bale and having connection with the clutch member so that it will when displaced move said clutch member out of engagement with the common operating member and into engagement with the tying device operating member.

In testimony whereof I affix my signature.

WILLIAM C. DEMENT.

Copies of this patent may be obtained for five cents each, by addressing the "Commissioner of Patents, Washington, D. C."